United States Patent
Hawley

[11] 3,898,414
[45] Aug. 5, 1975

[54] FILTER UNIT WITH CLEANING ATTACHMENT

[75] Inventor: Clyde W. Hawley, Fairport, N.Y.

[73] Assignee: Dollinger Corporation, Rochester, N.Y.

[22] Filed: May 6, 1974

[21] Appl. No.: 467,105

[52] U.S. Cl. .................. 219/72; 55/283; 55/289; 55/299; 55/304; 55/385; 55/467; 55/521
[51] Int. Cl.² .................. B23K 9/16; B01D 27/06; B01D 27/12
[58] Field of Search ............. 55/272, 282, 283, 289, 55/295–297, 298, 299, 301, 304, 305, 385, 420, 428, 467, 498, 510; 210/396; 219/72

[56] References Cited
UNITED STATES PATENTS

| | | | |
|---|---|---|---|
| 3,008,543 | 11/1961 | Bourdale et al. | 55/283 |
| 3,343,342 | 9/1967 | DuRocher | 55/304 X |
| 3,424,501 | 1/1969 | Young | 55/420 UX |
| 3,605,786 | 9/1971 | Machin, Jr. | 55/420 UX |

FOREIGN PATENTS OR APPLICATIONS

| | | | |
|---|---|---|---|
| 1,096,914 | 6/1955 | France | 55/272 |

OTHER PUBLICATIONS

Kollman, K. G., "Solving the Problem of GMAW Fume Extraction," In Welding Journal, p. 503–508, August, 1973.

Mishler, H. W., R. E. Monroe and D. C. Martin, "Final Report on Development of Special Welding-Nozzle Configuration," Battelle Memorial Institute, Columbus, Ohio, 9-30-62.

"Hobart Smoke Exhaust System," Hobart Bros. Co., Troy, Chicago, Bulletin No. 563-E. Received in Group 5-11-72.

*Primary Examiner*—Frank W. Lutter
*Assistant Examiner*—Kathleen J. Prunner
*Attorney, Agent, or Firm*—Shlesinger, Fitzsimmons & Shlesinger

[57] ABSTRACT

A cleaning system for a filter unit used in connection with a plurality of independently operable welding guns in which the suction chamber surrounding the tip of each gun is connected via sections of flexible hose and a flap valve to a main dust collecting pipe or manifold to which the inlet duct of the filter unit is attached. A source of suction is connected to the outlet duct of the filter unit so as to draw objectionable smoke and fumes that are generated in the area of the welds through the filter unit.

This filter comprises a cylindrical housing containing a conventional radial-fin filter cartridge. A plurality of straps are fastened to a shaft, that is journaled in the upper end of the housing for rotation from the exterior thereof, either manually or by a motor. The straps extend downwardly into the space between the housing and the cartridge. Each strap carries on its outer surface a flexible wiper, which engages the inside of the housing, and on its inner surface a plurality of vertically-spaced, flexible tabs, which project into the spaces between adjacent pleats in the cartridge. To clean the cartridge, the shaft is rotated so that the tabs knock the caked dust from the cartridge pleats as they pass or flex thereover, at the same time that the flexible wipers sweep dust from the inside surface of the housing.

8 Claims, 5 Drawing Figures

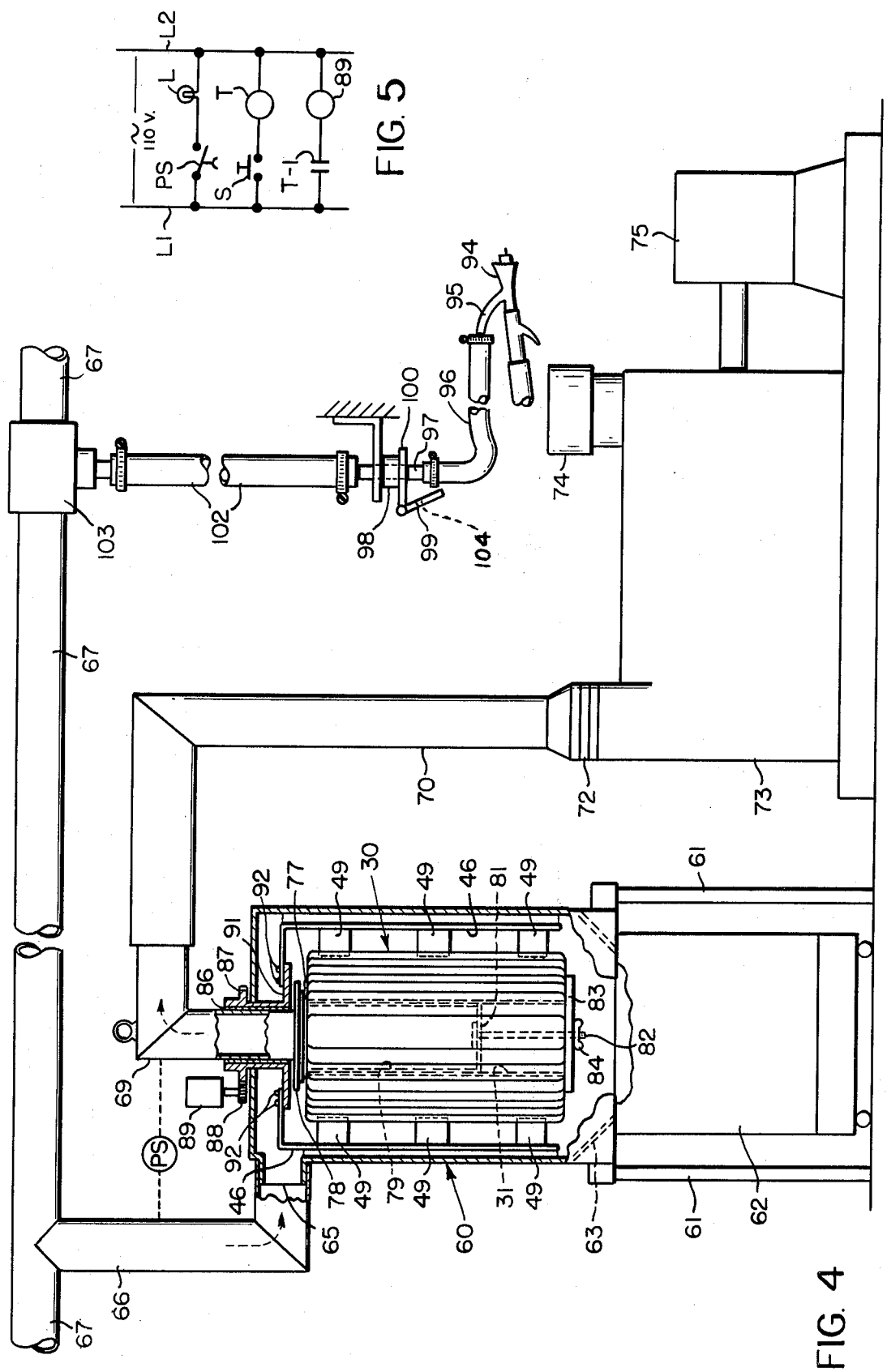

FILTER UNIT WITH CLEANING ATTACHMENT

This invention relates to filters, and more particularly to filters of the type that employ replaceable, pleated, radialfin filter cartridges.

The typical radial-fin filter cartridge has an axial bore surrounded by one or more layers of porous filtering fabric, which usually is or are mounted on pleated wire mesh to form radial pleats that extend axially of the cartridge. The fluid to be filtered passes radially inwardly through the porous pleats to the cartridge bore, which is connected to a suction source.

When a cartridge of this type is employed to remove dust or other particulate matter from a gaseous fluid, the pores in the cartridge eventually become clogged, thus causing a cake or layer of particles to build up on the outer surfaces of the pleats. This reduces the flow of fluid through the cartridge to the point where it becomes ineffective, and must be replaced or cleaned. Heretofore it has been necessary, in the case of most such filters, to remove the clogged cartridge from the filter housing in order to clean the dust cake from its outer surface. In applications where the filter is used extensively, or where it must remove large quantities of particulate matter from the fluid being filtered, much time and effort are required to keep the filter cartridge clean and operating efficiently.

A primary object of this invention is to provide a built-in cleaning attachment which enables a filter cartridge of the type described to be cleaned rapidly and efficiently without removal from the unit.

Another object of this invention is to provide a cleaning attachment of the type described which is operable from the exterior of the filter to cleanse not only the filter cartridge but simultaneously to remove the dust cake or other particles that build up on the inside wall of the filter housing.

Still another object of this invention is to provide a novel cleaning system for a filter unit designed to operate with welding units and service a plurality of independently operable welding units simultaneously to remove objectionable smoke and fumes that are generated in the areas of the welds produced in welding.

Other objects of this invention will be apparent hereinafter from the specification and from the recital of the appended claims, particularly when read in conjunction with the accompanying drawings.

IN THE DRAWINGS

FIG. 4 is a fragmentary elevational view of a filter system employing a filter unit and cleaning attachment made in accordance with another embodiment of this invention, portions of the unit being broken away and shown in section, and portions of the system being illustrated schematically; and FIG. 5 is a wiring diagram illustrating one manner in which the system of FIG. 4 can be wired for operation.

Figure 1:
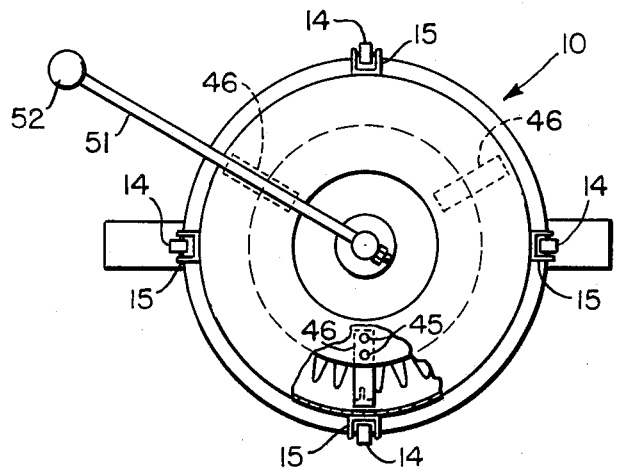
FIG. 1 is a plan view of a filter with a cleaning attachment made in accordance with one embodiment of this invention, part of the upper end of the filter housing being cut away to show part of its interior.
Figure 3:
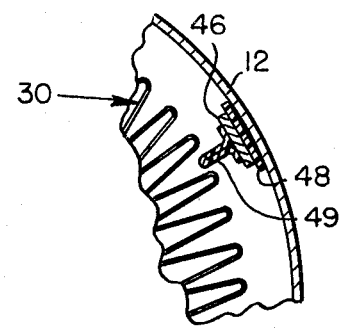
FIG. 3 is an enlarged, fragmentary sectional view taken along the line 3—3 in FIG. 2 looking in the direction of the arrows.
Figure 2:
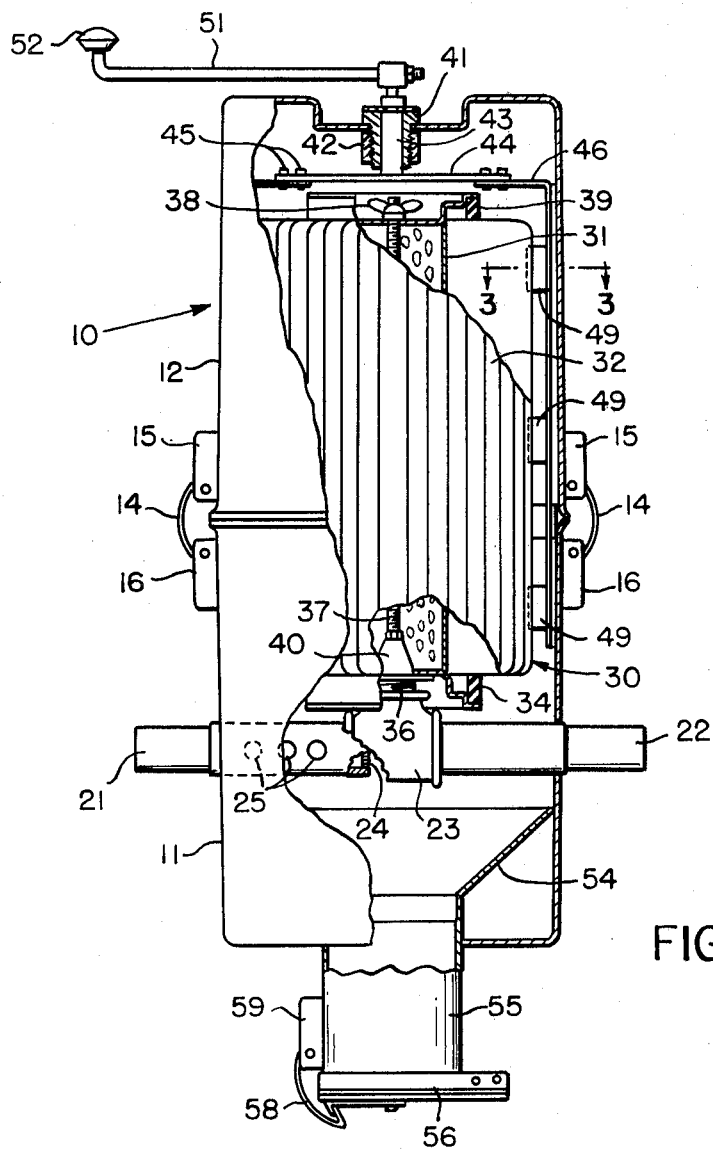
FIG. 2 is a side elevational view of this filter unit, portions of its housing and the filter cartridge therein being broken away and shown in section.

Referring now to the drawings by numerals of reference, and first to FIGS. 1 to 3, 10 denotes generally a two-piece housing or filter canister having a lower, generally cupshaped section 11, and an upper, inverted section 12 of similar configuration. The open ends of sections 11 and 12 are releasably secured together by a plurality of conventional clamps or clasps 14, which are mounted at one end to pivot on angularly spaced lugs 16 (FIG. 2) that project from section 11 adjacent its upper end. These clamps are releasably engageable in known manner at their upper ends with angularly spaced lugs 15 that are arranged around the lower end of section 12, thereby releasably and sealingly to secure together the sections 11 and 12.

Welded intermediate their ends in registering, diametrally opposed openings in the canister section 11 are aligned inlet and outlet pipes 21 and 22, respectively. The inner ends of these pipes are threaded into the aligned ends of a conventional T-fitting 23, which is supported centrally in section 11 by pipes 21 and 22. The bore of outlet pipe 22 opens on the interior of fitting 23; but the inner end of inlet pipe 21 is sealed closed by a disc or plug 24. Intermediate its ends, the portion of pipe 21 within the housing is provided with a plurality of ports 25, which communicate with the interior of canister 10.

Removably mounted within canister 10 coaxially thereof is a conventional, pleated filter cartridge 30, comprising an inner, perforated metal sleeve 31, and a porous, pleated filter element 32 of the radial-fin variety. The lower end of sleeve 31 is sealed by an end cap 34, which is fastened coaxially on the upper end of a nipple 36, which is removably threaded into the upper end of the T-fitting 23. A spider 40, which forms part of the end cap 34, is threaded or otherwise attached to the lower end of an externally threaded anchor bolt or rod 37, which extends coaxially upwardly through the filter cartridge. A wing nut 38, which threads onto the upper end of bolt 37 secures another end cap 39 sealingly over the upper end of sleeve 31.

Rotatably mounted in the bore of a bushing 41, which is fastened by a nut 42 in a central opening in the upper end of canister section 12, is a shaft 43. Secured to the lower end of shaft 42 for rotation thereby above and coaxially of cartridge 30 is a disc 44. Secured at their upper ends by screws or rivets 45 to disc 44 at equi-angularly spaced points thereabout are three, rigid right-angular straps 46. Each strap 46 extends vertically downwardly into the annular space between cartridge 30 and the surrounding canister sections 11 and 12, and has secured to its outer, vertical surface a thin, flexible wiper strip 48. This strip may be made of a polyester material, or the like; and its longitudinal edges are adapted to have wiping engagement with the inner peripheral surfaces of sections 11 and 12. Secured to the inner, vertically disposed surface of each strap 46 are a plurality (three in the embodiment illustrated) of vertically-spaced, flexible nylon tabs 49 (FIGS. 2 and 3), each of which is disposed normally to project radially inwardly into one of the spaces between adjacent pleats in the cartridge 30, so that when the disc 44 is rotated, the tabs engage and brush over the tips of the pleats as the tabs revolve around the outside of the cartridge.

The upper end of shaft 43 projects out of the upper end of housing 10 and is secured in any conventional manner to the inner end of a crank arm 51. On its outer end arm 51 has a knob 52 for manually rotating the arm.

Mounted in the lower end of section 11 beneath the fitting 23 is a funnel-shaped member 54, which has attached to its lower end an outlet tube 55, which projects out of the lower end of section 11. Pivotally mounted over the lower end of duct 55 in any conventional manner is a cap 56 which is normally held closed by a conventional clasp 58, that is pivotal on a lug 59 mounted on the exterior of duct 55.

In use, filter unit 10 is connected in a system so that the fluid to be filtered enters the inlet pipe 21, and is discharged through the ports 25 into the space in housing 10 around cartridge 30. This incoming fluid passes radially inwardly through the pleated section 32 of the cartridge, and through the apertures in sleeve 31 to the bore thereof. The nipple 36 communicates with the bore of sleeve 31, so that the filtered fluid leaves the filter cartridge through outlet pipe 22.

Whenever the cartridge 30 becomes clogged or dirty, the crank arm 51 is rotated manually to cause the tabs 49 to be rotated around the outside of cartridge 32 and to cause the strips 48 to be rotated around the inside of the canister. As the tabs 49 on each strap 46 pass over the outer end of a pleat of section 32, the pleat is flexed laterally and then snaps suddenly back to its original position. These flexing movements cause any dust or particulate matter that has caked or otherwise built-up onto the outer surface of the cartridge to be knocked loose and to drop down into the funnel member 54 and duct 55. To empty this sump the clasp 58 is disengaged from the cover 56, which may then be pivoted downwardly.

From the foregoing it will be apparent that a filter of the type described can be readily cleaned whenever its cartridge is dirty merely by rotating the crank arm 51, thus obviating the need for removing the cartridge itself from the housing, or canister sections 11 and 12. This obviously saves much time and labor as compared to prior filters of the type wherein it was necessary first to remove a cartridge from its housing before cleaning it. The pleated configuration of the outer filter element 32 makes this type of cartridge particularly suitable for cleaning by the attachment disclosed herein, since any dirt or particulate matter which is knocked loose by the tabs 49 can drop straight down through the spaces between adjacent pleats into the dust sump. Still another advantage of this attachment is that the inside of canister sections 11 and 12 are wiped clean by the rotating wiper strips 48 at the same time that the cartridge 30 itself is being cleaned by the tabs 49.

Referring now to FIGS. 4 and 5, wherein like numerals are used to denote elements similar to those employed in the first embodiment, 60 denotes a filter housing that forms part of a central filter unit which is designed to extract smoke and fumes from each of a plurality of welding booths or guns in a system thereof. Housing 60 is supported by a plurality of legs 61 over a mobile dirt collecting sump or truck 62, the upper end of which registers with the bottom of a tapered skirt or funnel 63, which is formed in the lower end of housing 60. Adjacent its upper end housing 60 has in one side an inlet duct 65 which is connected by a pipe 66 to an elongate header or main dust collecting pipe or manifold 67.

Projecting into the upper end of housing 60 coaxially thereof is a stationary exhaust duct 69. Exteriorly of the housing the upper, outer end of duct 69 is connected by a pipe 70 to the inlet or suction side of a floor-mountd housing 73. Housing 73 contains a conventional suction fan (not illustrated), which is operable by a motor 75, and has the usual outlet or exhaust, which in the illustrated embodiment is covered by another filter 74 of conventional design.

Releasably mounted over the inner end of outlet pipe 69 to be supported thereby coaxially within the housing 60 is a conventional filter cartridge 30, which may be of a construction similar to that employed in the first embodiment. The upper end of sleeve 31 in this cartridge is sealed by an upper end cap 77, which is secured to a flange 78 that surrounds the lower end of duct 69. A bracket 79, which projects from the underside of cap 77 into the upper end of cartridge sleeve 31, has on its lower end a transverse section 81, which is connected by a tie bolt 82 to a lower end cap 83. Cap 83 is releasably secured over the lower end of the cartridge sleeve 31 by a wing nut 84 which threads onto the lower end of bolt 82 exteriorly of the cartridge.

Above its flange 78 the lower end of pipe 69 is surrounded by a sleeve bearing 86, which projects slightly above and exteriorly of housing 60. Mounted to rotate about the bearing 86 above the upper end of housing 60 is a gear 87. The teeth of this gear mesh with those of a pinion 88, which is fixed to the shaft of a motor 89 that is also mounted above housing 60 to drive gear 87. The hub of gear 87 projects into the upper end of housing 60 and has formed on its inner end a circular flange 91, which is disposed above pipe flange 78. Secured at their upper ends to the flange 91 by rivets or screws 92, and projecting vertically downwardly into the space between cartridge 30 and the surrounding housing 60, are a plurality of tab-supporting legs 46. As in the first embodiment, three vertically-spaced, flexible nylon tabs 49 project from each leg 46 into engagement with the outer ends of the pleats of cartridge 30, when the gear 87 is driven by the motor 89. Also, flexible, plastic wiper strips, similar to those denoted at 48 in the first embodiment, are fastened to the outer surfaces of these legs 46 to wipe the interior surface of housing 60 as the legs are rotated.

In FIG. 4 a typical welding gun of the type, that is adapted to be serviced by this filter unit, is illustrated schematically at 94. The gun housing contains a suction chamber (not illustrated), which opens at its forward end around the tip 93 of the gun, and which is connected adjacent its rear end by a pipe 95, a flexible hose 96, and a tubular fitting 97, to a conventional flap valve 98. This valve has a pivotal cover 99, which is spring-loaded automatically to close over the inlet end 100 of valve 98, when the fitting 97 is pulled out of the bore of the valve, as for example, when the gun 94 is not in use. The opposite end of valve 98 is connected by a length of flexible hose 102 and a conventional T-fitting 103 to the header 67. Consequently, when the blower motor 75 is operating, the vacuum created in the outlet duct 69 is applied through the porous filter cartridge 30 and the filter housing inlet duct 66 to the header 67. Thus, when the hose 96 is attached to the valve 98 as illustrated in FIG. 4, a vacuum will be created at the tip of the welding gun 94 to draw smoke, fumes, spatter sparks, etc., through the flexible hoses 96 and 102, and the header 67 and pipe 66 into the housing 60. The smoke, fumes, etc., then pass radially inwardly through porous cartridge 30 to its bore, and thence through duct 66 and the pipe 70 and housing 73 to exhaust 74. The cartridge 30 thus functions to filter out particulate matter before the air or gas passes to the blower housing 73.

The cover 99 has a small orifice 104 through it so that air will continue to be drawn through hose 102, even after the fitting 97 is pulled out of the bore of valve 98, so as to maintain a balanced vacuum in the system.

After prolonged use the cartridge 30 becomes clogged and caked with dust particles, and the rate of flow of air through the filter is reduced, thereby increasing the pressure differential across the filter cartridge. To detect when the cartridge has become dirty, a differential pressure switch PS may be connected across the cartridge, for example between the pipes 66 and 69 as denoted schematically by broken lines in FIG. 4, to monitor the pressure drip between these pipes, and to effect the closure of the switch PS whenever this pressure differential rises to a predetermined value.

As illustrated by the wiring diagram in FIG. 5, the pressure switch PS may be connected in circuit with an indicator lamp L, which may be mounted in any convenient spot near the filter unit to be energized whenever the PS pressure switch closes. In the diagram L1 and L2 denote a pair of wires or lines that are connected across, for example, a 110 volt AC power source, which may be used to energize the lamp L. The switch PS and the lamp L are connected in series with each other between the lines L1 and L2. Also connected in series between these two lines are a conventional pushbutton operated switch S, and a conventional timer T, which controls a pair of normally-open switch contacts T-1. Contacts T-1 are connected in series with the motor 89 between the lines L1 and L2.

Whenever the switch S is closed, the timer T is energized for a predetermined interval, for example anywhere from 3 to 5 minutes. During this interval the timer T closes the switch contacts T-1, thereby energizing the motor 89 for this same interval, and in turn causing the pinion 88 to rotate the gear 87, and consequently the straps 46 (FIG. 4). During the rotation of straps 46 the tabs 49 thereon flex the radial folds in the cartridge 30, causing the caked dust thereon to be dislodged from the cartridge 30 and to drop downwardly through funnel 63 into dust sump 62. When the timer T has timed out or become deenergized at the end of said predetermined interval, the switch contacts T-1 return to their normally-open positions, thereby deenergizing the motor 89 and halting the rotation of the straps 46. As soon as the caked dust has been removed from cartridge 30 the air flow through the cartridge increases, thereby lowering the pressure differential sensed by the differential pressure switch PS, which in turn re-opens to deenergize the lamp L until such time that the cartridge 30 once again requires cleaning.

If desired, the motor 75 could be connected so as to be deenergized during operation of motor 89. This could be done by providing a timer T which operates both a set of normally-open contacts (e.g. T-1) and a set of normally-closed contacts, which could be connected in series with motor 75 between L1 and L2 to deenergize the fan while the cartridge is being cleaned. The filter 74 would, in any event, collect any dust or particles which might accidently pass through cartridge 30.

Several welding guns may be connected by hoses 102 similar to that shown in FIG. 4, to mainline or header 67 so that a single filter unit 60, and cooperating suction fan and motor 75 may serve several welding units simultaneously.

From the foregoing it will be apparent that a central filter unit of the type illustrated in FIGS. 4 and 5 considerably improves the operating efficiency of a multi-gun welding system. Since the unit can be constructed automatically to clean its filter cartridge whenever the latter becomes unduly dirty or clogged, the overall system will normally operate at top efficiency, and need be shut down only when the cartridge is worn out and must be replaced. When a gun 94 is not in use, its fitting 97 is withdrawn from the associated valve 98, which thus is closed immediately by its flap 99 to prevent any unnecessary drain on the vacuum in header 67.

While the invention has been described in detail with respect to only certain embodiments thereof, it will be readily apparent that other modifications are possible, and this application is intended to cover any such modification which falls within the scope of the invention or the limits of the appended claims.

Having thus described my invention, what I claim is:

1. A filter comprising
  a housing having a fluid inlet and a fluid outlet,
  means connecting said outlet to a vacuum source to draw fluid through said housing from said inlet,
  a porous pleated filter cartridge removably secured in said housing with its periphery spaced from the inside wall of said housing and between said inlet and said outlet and having an axial bore closed at one end and connected at its opposite end to said outlet,
  a rotatable support mounted in said housing coaxially of said bore,
  a plurality of axially-extending, rigid straps mounted on said support around the outside of said cartridge in the space between the periphery of said cartridge and the inside wall of said housing, each of said straps having a plurality of tabs mounted in spaced relation longitudinally along the strap, each of said tabs projecting part way into the space between adjacent pleats in said cartridge, whereby upon rotation of said support, said tabs flex said pleats thereby to jar caked particles from the pleats, and
  drive means on the exterior of said housing connected to said support to effect rotation of said support relative to said housing.

2. A filter, comprising
  a housing having a fluid inlet and a fluid outlet,
  means connecting said outlet to a vacuum source to draw fluid through said housing from said inlet,
  a porous, pleated filter cartridge removably secured in said housing between said inlet and said outlet to filter particles from the fluid passing therebetween and having an axial bore closed at one end and connected at its opposite end to said outlet,
  a rotatable support mounted in said housing coaxially of said bore,
  a plurality of spaced tabs mounted on said support around the outside of said pleated cartridge, each of said tabs projecting part way into the space between adjacent pleats in said cartridge, whereby upon rotation of said support said tabs flex said pleats to jar caked particles therefrom, and drive means on the exterior of said housing connected to said support to effect rotation of said support relative to said housing, said support comprising a plurality of axially-extending straps arranged in angularly spaced relation around the outside of said cartridge parallel to the pleats thereof, said tabs being secured to said straps at spaced points therealong, and an elongate, flexible wiper means mounted on each of said straps to have sliding contact with the inside wall of said housing to sweep particles therefrom during rotation of said support.

3. A filter as defined in claim 2, wherein a sump is positioned beneath the lower end of said housing beneath said cartridge to receive particles jarred loose from the cartridge and housing by said tabs and wiper, respectively.

4. In a filter system including a plurality of welding guns of the type in which a vacuum chamber in each gun opens on the welding tip thereof to draw smoke and particles from the vicinity of a weld during use of the gun, a manifold, means connecting the vacuum chamber of each gun to said manifold, comprising a first duct connected at one end to an opening in said manifold, a valve connected to the opposite end of said duct, a second duct connected at one end to the vacuum chamber on one of said guns, means for releasably connecting the opposite end of said second duct to said valve from communication thereby with said manifold, and means operative automatically to close said valve when said opposite end of said second duct is disconnected therefrom, and a filter unit comprising a housing having an inlet and an outlet, means connecting the inlet of said housing to said manifold, means for applying a vacuum to the outlet of said housing to draw smoke and particles from the vacuum chamber of each gun through its associated ducts and valve, when open, into said housing, a porous, pleated filter cartridge removably mounted in said housing to cover said inlet to filter out particles drawn into the housing by the vacuum means, and means for cleaning accumulated particles from the pleated surfaces of said cartridge without removing the cartridge from said housing.

5. A filter system as claimed in claim 4, wherein said means for cleaning said cartridge comprises a plurality of spaced tabs mounted around the outside of said cartridge and having portions thereof projecting part way into the spaces between adjacent pleats in the cartridge, means for detecting the pressure differential between said inlet and said outlet when a vacuum is applied to said inlet, and drive means connected to said tabs and operative, when said pressure differential exceeds a predetermined value, automatically to revolve said tabs about said cartridge to drag the projecting portions of said tabs successively across the peaks of pleats in the cartridge to jar loose any particles caked thereon.

6. A system as defined in claim 5, wherein said drive means comprises a support rotatably mounted in an opening in one end of said housing, said outlet comprises a stationary pipe projecting coaxially through an axial bore in said support into said one end of said housing, said cartridge has an axial bore closed at one end and releasably attached at its opposite end to said pipe to be supported thereby in the housing with its pleats extending vertically, a plurality of straps are attached to said support and project vertically downwardly in angularly spaced relation around the outside of said cartridge, between said cartridge and said housing, and a plurality of said tabs are attached to each of said straps at spaced points therealong to project radially inwardly into the spaces between adjacent pleats on said cartridge.

7. In a filter system including a plurality of welding guns of the type in which a vacuum chamber in each gun opens on the welding tip thereof to draw smoke and particles from the vicinity of a weld during use of the gun, a manifold, a first duct connected at one end to an opening in said manifold, a valve connected to the opposite end of said duct, a second duct connected at one end to the vacuum chamber on one of said guns, means for releasably connecting the opposite end of said second duct to said valve for communication thereby with said manifold, means operative automatically to close said valve when said opposite end of said second duct is disconnected therefrom, a filter unit comprising a housing having an inlet and an outlet, means connecting the inlet of said housing to said manifold, means for applying a vacuum to the outlet of said housing to draw smoke and particles from said vacuum chamber on said one gun through said ducts and said valve, when open, into said housing, a porous filter cartridge removably mounted in said housing to enclose said inlet to filter out particles drawn into the housing by the vacuum means, said cartridge having thereon a plurality of spaced, parallel pleats upon which particles drawn into said housing settle, a plurality of spaced tabs mounted around the outside of said cartridge, said tabs having portions thereof projecting part way into the spaces between adjacent pleats in the cartridge, means for detecting the pressure differential between said inlet and said outlet when a vacuum is applied in said inlet, drive means connected to said tabs and operative, when said pressure differential exceeds a predetermined value, automatically to revolve said tabs about said cartridge to drag the projecting portions of said tabs successively across the peaks of pleats in the cartridge to jar loose any particles caked thereon, said drive means comprising a support rotatably mounted in an opening in one end of said housing,
said outlet comprising a stationary pipe projecting coaxially through an axial bore in said support into said one end of said housing,
said cartridge having an axial bore closed at one end and releasably attached at its opposite end to said pipe to be supported thereby in the housing with its pleats extending vertically, and
a plurality of rigid straps attached to said support and projecting vertically downwardly in angularly spaced relation around the outside of said cartridge, between said cartridge and said housing,
a plurality of said tabs being attached to each of said straps at spaced points therealong to project radially inwardly into the spaces between adjacent folds on said cartridge,
each of said straps having a cleaning strip attached thereto to the opposite side of the strap from its tabs in position to engage the inside wall of said housing to sweep over and clean the same during rotation of said support.

8. A system as claimed in claim 7, wherein a receptacle is mounted in said housing beneath said cartridge to receive dust and the like wiped off the cartridge and said wall.

* * * * *